(12) United States Patent
Kotik et al.

(10) Patent No.: US 10,583,747 B2
(45) Date of Patent: Mar. 10, 2020

(54) VEHICLE BATTERY SYSTEM WITH A PLURALITY OF STRAPS

(71) Applicants: Robert Bosch GmbH, Stuttgart (DE); Mark Kotik, Rochester Hills, MI (US); Robert Schoenherr, Oak Park, MI (US); Nick Adonakis, West Bloomfield, MI (US); Jessica Chow, Middle Village, NY (US); Mehul Botadra, Sterling Heights, MI (US)

(72) Inventors: Mark Kotik, Rochester Hills, MI (US); Robert Schoenherr, Oak Park, MI (US); Nick Adonakis, West Bloomfield, MI (US); Jessica Chow, Middle Village, NY (US); Mehul Botadra, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 15/505,225

(22) PCT Filed: Aug. 21, 2015

(86) PCT No.: PCT/US2015/046240
§ 371 (c)(1),
(2) Date: Feb. 20, 2017

(87) PCT Pub. No.: WO2016/029084
PCT Pub. Date: Feb. 25, 2016

(65) Prior Publication Data
US 2017/0267121 A1    Sep. 21, 2017

Related U.S. Application Data

(60) Provisional application No. 62/040,474, filed on Aug. 22, 2014.

(51) Int. Cl.
*B60L 11/18*    (2006.01)
*H01M 2/10*    (2006.01)
(Continued)

(52) U.S. Cl.
CPC ............ *B60L 11/1879* (2013.01); *B60K 1/04* (2013.01); *B60L 50/64* (2019.02); *B60L 50/66* (2019.02);
(Continued)

(58) Field of Classification Search
CPC .............. B60K 1/04; B60K 2001/0438; B60L 11/1877; B60L 11/1879; B60L 50/64;
(Continued)

(56) References Cited

U.S. PATENT DOCUMENTS

2005/0274556 A1\* 12/2005 Chaney .................... B60K 1/04
180/68.5
2012/0328925 A1\* 12/2012 Choo .................. H01M 2/1077
429/99
(Continued)

FOREIGN PATENT DOCUMENTS

CN    103269941    8/2013
JP    2013103635 A    5/2013
(Continued)

OTHER PUBLICATIONS

International Search Report and Written Opinion corresponding to PCT Application No. PCT/US2015/046240, dated Nov. 27, 2015 (11 pages).
(Continued)

*Primary Examiner* — Lingwen R Zeng
(74) *Attorney, Agent, or Firm* — Maginot, Moore & Beck LLP

(57) ABSTRACT

A vehicle battery system includes a battery housing and a plurality of straps. The battery housing is configured to
(Continued)

house a battery for powering the vehicle. Each of the plurality of straps is configured to extend about the battery housing, and includes a first end portion and a second end portion that are configured to be attached to the vehicle. The plurality of straps is configured such that upon application of a shock load to the battery housing along a first axis, the plurality of straps deforms prior to deformation of the battery housing.

19 Claims, 3 Drawing Sheets

(51) Int. Cl.
*B60K 1/04* (2019.01)
*B60L 50/60* (2019.01)
*B60L 50/64* (2019.01)

(52) U.S. Cl.
CPC ....... *H01M 2/1083* (2013.01); *H01M 2/1094* (2013.01); *B60K 2001/0438* (2013.01); *B60Y 2306/01* (2013.01); *H01M 2220/20* (2013.01); *Y02T 10/705* (2013.01); *Y02T 10/7005* (2013.01)

(58) Field of Classification Search
CPC ................ B60L 50/66; B60Y 2306/01; H01M 2220/20; H01M 2/1083; H01M 2/1094; Y02T 10/7005; Y02T 10/705
See application file for complete search history.

(56) References Cited

U.S. PATENT DOCUMENTS

| 2013/0295437 A1* | 11/2013 | Kreutzer | H01M 2/1083 |
| | | | 429/159 |
| 2014/0127552 A1* | 5/2014 | Lu | H01M 2/1077 |
| | | | 429/156 |

FOREIGN PATENT DOCUMENTS

| JP | 2013112160 A | 6/2013 |
| JP | 2014101009 A | 6/2014 |
| KR | 1020120075227 A | 7/2012 |

OTHER PUBLICATIONS

Search Report (English translation) from corresponding CN patent application No. 201580044975.7, dated Jun. 19, 2018 (2 pages).

* cited by examiner

VEHICLE BATTERY SYSTEM WITH A PLURALITY OF STRAPS

CROSS REFERENCE TO OTHER APPLICATIONS

This application is a 35 U.S.C. § 371 National Stage Application of PCT/US2015/046240, entitled "A VEHICLE BATTERY SYSTEM WITH A PLURALITY OF STRAPS" by Kotik et al., filed Aug. 21, 2015, which claims priority to U.S. Provisional Application Ser. No. 62/040,474 entitled "STRAPS FOR RESTRAINING A BATTERY SYSTEM" by Kotik et al., filed Aug. 22, 2014, the disclosures of which are hereby incorporated herein by reference in their entirety.

TECHNICAL FIELD

This disclosure relates generally to automotive systems, and, more particularly, to battery systems for an electric vehicle.

BACKGROUND

Battery systems in electric vehicles are generally subjected to two types of loads. Normal operation of the vehicle, such as stopping and starting, accelerating, turning, and the like results in the application of nominal loads on the battery system. Many conventional battery mounting systems utilize rigid mounts, a rigid frame, or non-compliant straps. In these types of conventional battery mounting systems, the nominal loads are absorbed by nominal elastic deformations in the battery mounting system and the battery system itself. However, battery systems are also subjected to significantly higher shock loads, such as during extreme braking, vehicle malfunction, or an impact or crash. Such shock loads can overwhelm the elastic resiliency the mounts and straps of conventional mounting systems, whereby the battery system undergoes plastic deformation which can result in damage to the battery system, interruption in the operation of the vehicle, as well as significant safety risks.

Battery mounting systems have been developed that include a carriage or bay mounted on springs that damp shock loads acting on the battery system. However, such carriages are expensive to produce, install, and maintain, reduce access to the battery system, and add undesired weight and complexity to the vehicle.

Therefore, what is needed is a mounting system for mounting a battery system to an underside of an electric vehicle that sufficiently absorbs energy from shock loads without adding undesired weight, expense, or complexity to the electric vehicle.

SUMMARY

A vehicle battery system includes a battery housing and a plurality of straps. The housing is configured to housing a battery, and includes a plurality of guides distributed along a first axis. Each of the guides extends at least partially about the battery housing along a second axis that is orthogonal to the first axis, and includes a first channel portion in the battery housing. Each first channel portion extends along a first side of the battery housing lying on a plane defined by the first axis and the second axis, and defines a wall portion perpendicular to the first axis. Each of the straps is associated with a respective one of the guides, and is configured to extend about the battery housing. Each strap includes a first end portion and a second end portion. Each of the first end portions and each of the second end portions is configured to be attached to a vehicle. Each of the straps is configured to deform in response to contact with the wall portion of the respective one of the guides, such that upon application of a shock load to the battery housing along a first axis, the plurality of straps deforms prior to deformation of the battery housing.

In some embodiments, the straps are further configured such that upon application of a shock load to the battery housing along the second axis, the plurality of straps deforms prior to deformation of the battery housing.

In some embodiments, the straps are further configured such that upon application of a shock load to the battery housing along a third axis orthogonal to the first axis and the second axis, the plurality of straps deforms prior to deformation of the battery housing.

In some embodiments, each of the guides further includes a second channel portion in the battery housing. The second channel portion extends along a second side of the battery housing that lies on a plane defined by the first axis and the third axis.

In some embodiments, each of the guides further includes a third channel portion in the battery housing. The third channel portion extends along a third side of the battery housing that lies parallel to the second side.

In some embodiments, the first end portions and the second end portions of the plurality of straps are configured to hold each of the plurality of straps in tension when attached to the vehicle.

In some embodiments, each of the straps defines a U-channel. The U-channel includes a base received in the first channel portion, and a pair of side portions respectively received in the second channel portion and the third channel portion.

In some embodiments, the U-channel has a C-channel cross section, at least in part. The C-channel cross section includes a pair of side portions that extend outwardly away from the battery housing and bear against the wall portion of the first channel portion, and a back portion that extends between the pair of side portions and supports the battery housing. The C-channel is configured to reinforce a stiffness of each strap along at least one axis.

In some embodiments, the straps are further configured to deform to absorb a shock load of at least 50 g's along at least one of the first axis, the second axis, and the third axis prior to deformation of the battery housing.

In some embodiments, the straps are further configured to deform to absorb a shock load of at least 50 g's along each of the first axis, the second axis, and the third axis prior to deformation of the battery housing.

In some embodiments, each of the first end portions and the second end portions defines a hole, and a respective connection member passes through the hole of each of the first end portions and the second end portions to attach the first end portions and second end portions to the vehicle.

In some embodiments, the respective connection member includes at least one of a bolt, a screw, a peg, a clip, and a hook.

In some embodiments, each of the first end portions and the second end portions is attached to an underside of the vehicle.

In some embodiments, the system is positioned at least partially within a recess in the underside of the vehicle.

In some embodiments, the system further includes a cover plate configured to cover a side of the battery housing facing away from the vehicle.

In some embodiments, the cover plate is attached to the underside of the vehicle and is unattached to the battery housing and the plurality of straps.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
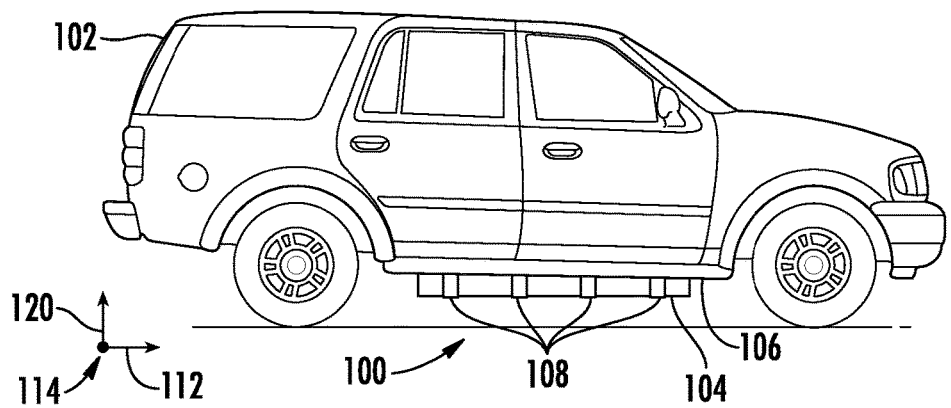
FIG. 1 is a side view of an exemplary embodiment of a battery system mounted to an underside of an electric vehicle with a mounting system according to this disclosure.

FIG. 1 depicts a side view of a battery mounting system 100 for an electric vehicle 102 according to this disclosure, whereby a battery housing 104 which houses a battery (not shown) is mounted to an underside 106 of the electric vehicle 102 via a plurality of straps 108. The straps 108 are configured such that upon application of a shock load to the battery housing, the plurality of straps 108 deform prior to deformation of the battery housing 104, as discussed in further detail below.

Figure 2:
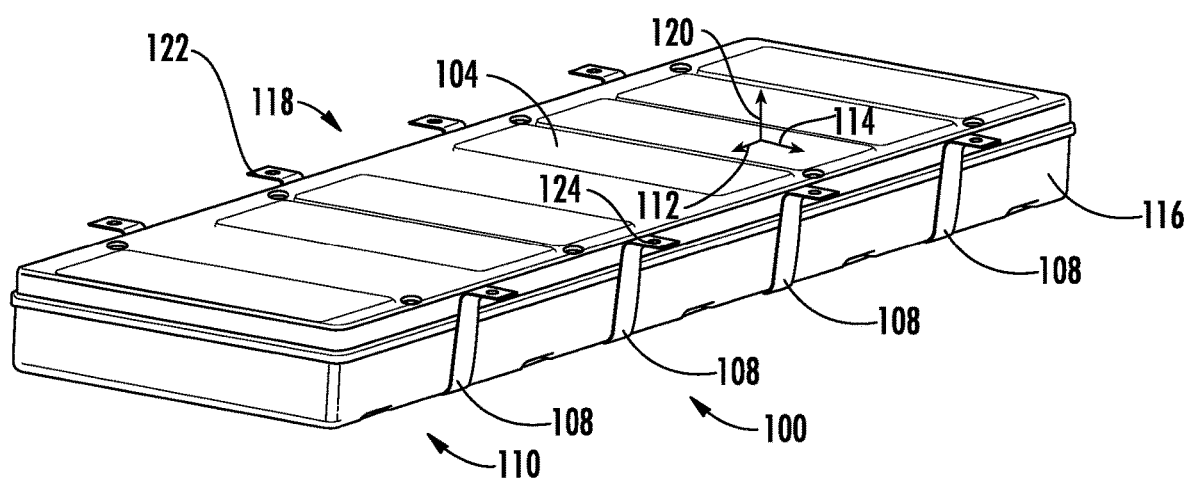
FIG. 2 is a perspective view of the battery mounting system of FIG. 1.

FIG. 2 illustrates a perspective view of a battery mounting system 100 according to the present disclosure. The battery system 104 has a bottom face 110 lying parallel to a plane defined by a first axis 112 and a second axis 114, and a pair of opposing lateral faces 116 and 118 that lie parallel to a plane defined by the first axis 112 and a third axis 120. Each of the plurality of straps 108 is configured to extend about the battery housing 104, and includes a first end portion 122 and a second end portion 124. The first end portions 122 and the second end portions 124 are configured to attach to the vehicle 102 illustrated in FIG. 1. Generally, the first end portions 122 are opposite the second end portions 124 along the second axis 114 such that the straps 108 run generally along the second axis 114.

In the embodiment illustrated in FIGS. 1-5, the system 100 includes four straps 108 that are positioned so as to be evenly spaced along the battery housing 104 along the first axis 112. In other embodiments, the system 100 includes other numbers of straps 108 in order to, for example, support a battery housing 104 having a relatively larger weight or size. Straps 108 can also be spaced irregularly along the first axis in order to, for example, support a battery housing 104 that has an irregular distribution of weight.

Figure 3:
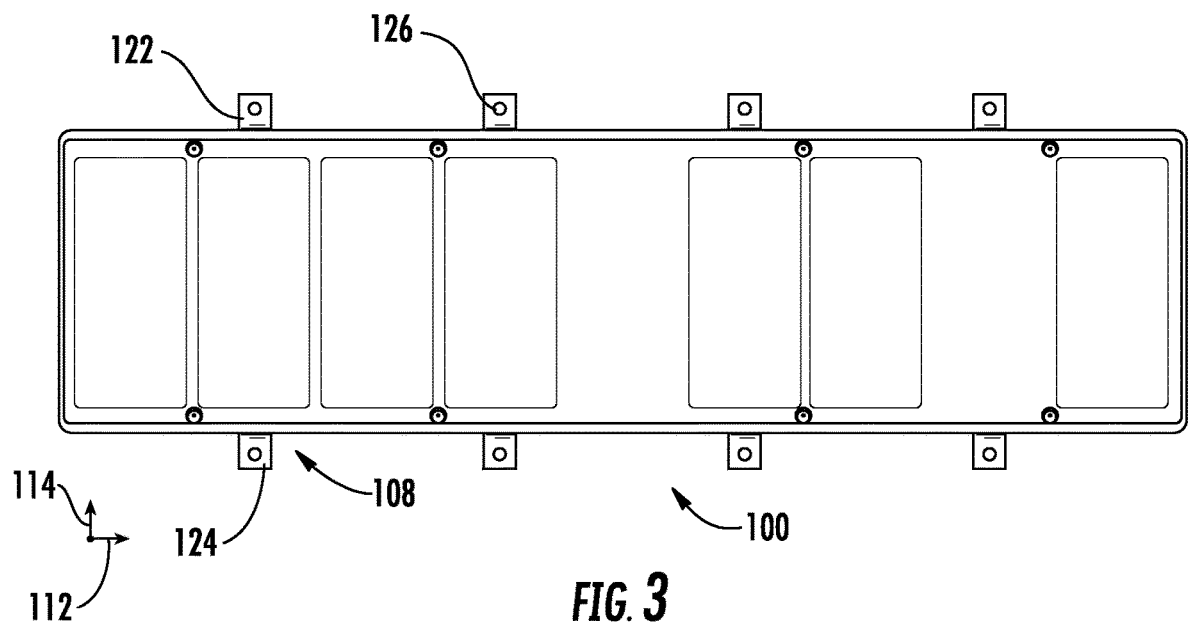
FIG. 3 is a top view of the battery mounting system depicted in FIG. 1.

FIG. 3 illustrates a top view of the system 100. Each of the first end portions 122 and the second end portions 124 define a hole 126 that allow the end portions 122 and 124 to be attached to the vehicle 102 via any acceptable connection member (not shown), such as, for example, a bolt, a screw, a hook, or the like. In other embodiments, the first end portions 122 and the second end portions 124 define attachment members for attaching to the vehicle 102 independent of a connection member, such as a loop configured to hook onto a protrusion on the vehicle 102, a welding flange for forming a welded connection, a clip, a clamp, or any other acceptable attachment member.

Figure 4:
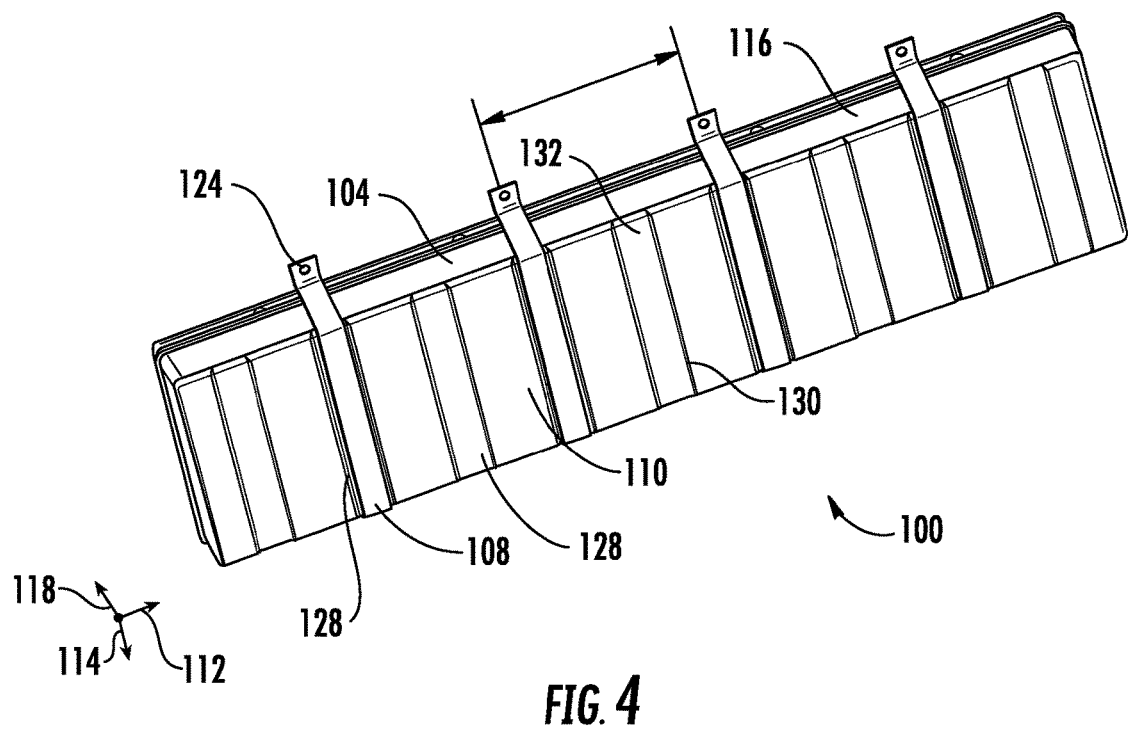
FIG. 4 is a bottom perspective view of the battery mounting system depicted in FIG. 1.

FIG. 4 illustrates an underside perspective view of the system 100. In this embodiment, the battery housing 104 is supported by the straps 108 in an uncoupled fashion. In other embodiments, the straps 108 are attached to the battery housing by any acceptable fastening members (not shown) such as bolts, pins, welds, or the like.

The battery housing 104 additionally includes a plurality of guides 128 for defining a position of the straps 108 relative to the battery housing 104, and for facilitating a transfer of forces between the straps 108 and the battery housing 104 as described in more detail below. Each of the plurality of guides 128 extends at least partially about the battery housing 104 along the second axis 114 and defines a wall portion 130 perpendicular to the first axis 112. Each of the plurality of straps 108 is associated with a respective one of the plurality of guides 128 such that each strap 108 is at least partially received in an associated one of the plurality of guides 128.

In the embodiment illustrated in FIG. 4, each of the plurality of guides 128 includes a first channel portion 132 that extends along the bottom face 110 of the battery housing 104. The wall portion 130 of each guide 128 is a wall portion 130 of the first channel portion 132. In other embodiments (not shown), each of the plurality of guides 128 further includes a second channel portion and a third channel portion that respectively extend along the lateral sides 116 and 118 in a direction substantially parallel to the third axis 120. In other embodiments, other types of guides 128 are also acceptable, including guide-loops, protrusions from the battery housing 104 that have a shape complementary to at least a portion of the straps 108, or the like.

Figure 5:
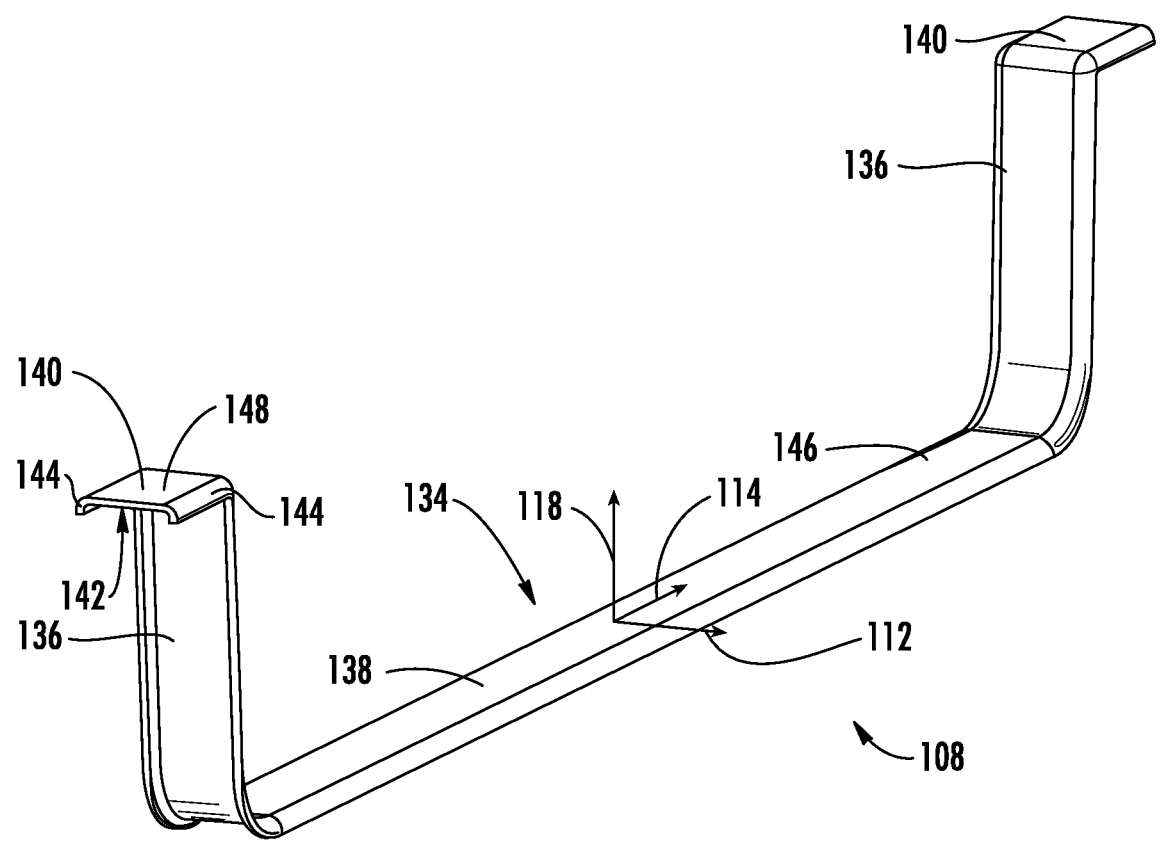
FIG. 5 is a perspective view of a strap of the battery mounting system depicted in FIG. 1.

FIG. 5 illustrates a perspective view of a strap 108 that is usable with the system 100 illustrated in FIGS. 1-4. The strap 108 defines a U-channel 134 when viewed along the first axis 112 includes a pair of side portions 136 that run generally parallel to the third axis 120, and a base portion 138 that extends between the pair of side portions 136 and runs generally parallel to the second axis 114. Each side portion 136 includes an end portion 140 on an end opposite the base portion 138. The U-channel 134 is configured to support the battery housing 104 (FIG. 4).

When the battery housing 104 of FIG. 4 is received in the U-channel 134, the base portion 138 is received in a corresponding guide 128, and in particular is received in the first channel portion 132 of the corresponding guide 128. The base portion 138 is sized such that the side portions 136 abut the lateral sides 114 and 116 of the battery housing respectively. In embodiments where each of the plurality of guides 128 further includes a second channel portion and a third channel portion, the pair of side portions 136 are additionally received in the second channel portion and third channel portion, respectively when the battery housing 104 is received in the U-channel 134. The side portions 136 are also sized such that when the end portions 140 are attached to the vehicle 102, the battery housing 104 abuts the vehicle 102 and the base portion 138.

The U-channel 134 has a C-channel cross section 142, at least in part, that includes a pair of side walls 144 that extend outwardly away from an inner side 146 of the U-channel 134, and a base wall 148 that extends between the pair of side walls 144 and that includes the inner side 146. The base wall 148 is configured to fit within at least the first channel region 132 of a corresponding guide 128 such that the side wall(s) 144 abut the wall portion 130 of the first channel region 132. The side wall(s) 144 are also configured to abut wall portions of second and third channel regions of the guide 128, when present.

The system 100 desirably holds the battery housing 104 in place during normal operation of the vehicle. In other words, the plurality of straps 108 is configured to elastically deform along with the battery housing 104 under the application of normal loads during normal operation of the vehicle 102.

The plurality of straps 108 is further configured such that, when each of the first end portions 122 and the second end portions 124 are connected to the vehicle 102, the straps 108 urge the battery housing 104 against the vehicle 102 and are held in tension by the connections between the vehicle 102 and the first end portions 122 and the second end portions 124 respectively.

In some embodiments, the connections between the vehicle 102 and the first end portions 122 and the second end portions 124 are adjustable to modify an amount of tension in the plurality of straps 108. For example, in an embodiment where screws are used to attach a first end portion 122 and second end portion 124 of a strap 108 to the vehicle 102, an amount of tension in the strap 108 is adjustable by tightening or loosening the screw. Tension in the plurality of straps 108 causes the battery housing 104 to be held in compression against the vehicle 102. This ensures that the vehicle 102 and plurality of straps 108 elastically support the battery housing 104 during normal operation of the vehicle. Tension in the straps 108 also affects the deformation behavior in the straps 108 by decreasing an amount of energy needed to cause the straps 108 to yield beyond elastic deformation and being to plastically deform, as described in further detail below.

Desirably, the straps 108 are configured to elastically deform when acted on by normal loads during normal operation of the vehicle, and are further configured to plastically deform when acted on by shock loads. When acted on by a load, an element deforms based on the stiffness of the element and the magnitude of the load. The deformation results from the stress applied to the element and, for continuous elements, is described by Hooke's Law:

$$\sigma_i = E \cdot \epsilon_i$$

where $\sigma$ is the stress caused by an applied load, $\epsilon$ is the strain, or deformation experienced by the element, E is the elastic modulus of the element corresponding to the stiffness or elasticity of the element, and i is the direction of the acting load and of the deformation $\epsilon$. The stress $\sigma$ is equal to the force F acting in the direction i divided by the cross-sectional area A viewed along the direction i. The force F is defined by $$F = m \cdot a$$

where m is the mass of the element, and a is the acceleration experienced by the element, for example due to acceleration or deceleration of the vehicle 102. Because different battery housings 104 can have a wide variety of different masses, loads acting on the system 100 can be expressed in terms of acceleration where, for example, a shock load is equal to at least 50 g's, or about 490 m/s$^2$. Thus, the normal acceleration loads experienced during normal operation of the vehicle result in lower stresses, and higher acceleration loads of a shock load result in higher stresses.

The battery system 104 generally has a larger area A than the plurality of straps 108 along any direction, but also generally has a larger mass than the plurality of straps 108. Because the difference in mass is generally larger than the difference in area, the battery housing 104 generally experiences more stress $\sigma$ than the plurality of straps 108 given a particular acceleration a.

The higher the stress $\sigma$ acting on an element, the larger the deformation $\epsilon$ experienced by that element. This means that, all other factors being equal, because the mass of the battery housing 104 is generally larger than the mass of the plurality of straps 108, the stress in the battery housing 104 will be higher than the stress in the straps 108.

When an applied load is large enough to overcome the elasticity of a material, the material beings to irreversibly plastically deform. Each material has a yield strength, generally defined as an amount of stress which a material can absorb via elastic deformation without plastically deforming. When the stress $\sigma$ due to the applied load exceeds the yield strength of the material, the material will plastically deform.

The straps 108 are desirably configured to plastically deform prior to plastic deformation of the battery housing 104 in order to protect the battery housing 104 from damage. Because the same acceleration load a is applied to both the straps 108 and the battery housing 104, characteristics of the straps 108 are selected to allow the straps 108 to plastically deform prior to the battery housing 104 when acted on by shock loads along at least one of the first axis 112, the second axis 114, and the third axis 120. In particular, the plurality of the straps 108 is configured to plastically deform under application of a shock load of at least 50 g's along each of the first axis 112, the second axis 114, and the third axis 120 prior to deformation of the battery housing 104.

One adjustable characteristic of the plurality of the straps 108 is the yield strength, which is determined by the properties of the materials selected to form the straps 108. In other words, material(s) can be selected to form the straps 108 that have a lower yield strength such that the stress needed to cause the straps 108 to yield is less than the heightened stress in the battery housing 104 due to its high mass.

Another characteristic of the straps 108 that can be adjusted is the cross-sectional area of the straps 108. As discussed above, the yield strength of a material is expressed in terms of stress, i.e. force per area. Therefore, modifying the thickness of the straps 108 modifies the area distributing the stress. This in turn affects the amount of force, and thus the acceleration load, that can be withstood by the straps 108 before the yield strength is reached. However, changing the thickness of the straps 108 affects the cross-sectional area of the straps 108 along all axes. Additionally, if the straps 108 are too thin, they will fail to support the battery housing 104 during normal operation of the vehicle 102. Further, thickening the straps 108 undesirably increases the weight and cost of the straps 108.

By modifying the shape of the cross section of the straps 108, the cross-sectional area of the straps 108 along a particular axis can be adjusted. The C-channel cross section 142 illustrated in FIG. 5 is configured to reinforce the stiffness of the strap 108 along at least one axis. For example, compared to a strap of the same thickness only having a base portion 134, the side walls 144 increase the cross sectional area of the strap 108, and thus decrease the stress experienced by the strap 108 given a particular applied load.

The side wall(s) 144, as described above, are also configured to abut the wall portion 130 of the first channel region 132. This facilitates a transfer of loads between the plurality of straps 108 and the battery housing 104 which allows the plurality of straps 108 to support the battery housing 104 when acted on by a load on at least the first axis 112. When the load is in the elastic range, the side wall(s) 144 ensure that the plurality of straps 108 and the battery housing 104 move and elastically deform together. When the load is in the plastic range, the side wall(s) 144 ensure that the load acting on the battery housing 104 is transferred to the plurality of straps 108.

The stiffness of the plurality of straps 108 can also be adjusted by modifying the number of straps 108 in the system 100. Because each strap 108 is attached to the vehicle 102 independently from the other straps 108, the straps 108 act in parallel, and thus the stress σ acting on the plurality of straps 108 as a whole is defined by the total force of the applied load divided by the net sum of the cross-sectional areas of all of the straps 108 when viewed in the acting direction of the load i. Therefore, increasing the number of straps 108 increases the force that can be absorbed by the plurality of straps 108 before the yield strength is reached, and decreasing the number of straps 108 decreases the force that can be absorbed by the plurality of straps 108 before the yield strength is reached.

Another characteristic that can be adjusted is the tension of the straps 108. As discussed above, the connections between the first ends 122 and the second ends 124 of the straps 108 and the vehicle 102 can be tightened or loosened in order to adjust an amount of tension in the straps 108. Tension corresponds to an internal stress. Thus, the pre-tension in the straps 108 due to the connections between the straps 108 and the vehicle pre-stresses the straps 108, and reduces the amount of additional stress that the straps 108 can withstand before yielding.

Thus, the plurality of straps 108 can be configured to plastically deform under application of a shock load of at least 50 g's prior to plastic deformation of the battery housing by selecting the thickness of the straps 108, the number of straps 108 in the system, the cross section of the straps 108, the pre-tensioning of the straps, and by selecting material with different yield strengths to form the straps 108. Of course, the design shock load for the straps 108 will vary depending on the configuration (including materials, mass, and structure) of the battery housing 104. These characteristics can also be optimized to minimize a cost and weight of the plurality of straps 108.

Adjusting the tension of the straps 108 also facilitates the transfer of load between the straps 108 and the battery housing 104 along the second axis 114, i.e. between the region of the base portions 138 of the straps 108 abutting the lateral faces 114 and 116 of the battery housing 104. When the straps 108 are held in tension, the regions of the straps 108 abutting the battery housing 104 are urged against the battery housing 104. Similarly, adjusting the tension facilitates the transfer of load between the regions of the base portions 138 of the straps 108 abutting the bottom face 110 of the battery housing.

In a preferred embodiment, the battery housing 104 is mounted to an underside of the vehicle 102 by connecting the first end portions 122 and the second end portion 124 of the straps 108 to connection points on the underside 106 of the vehicle 102. In order to protect the system 100 from inadvertent impacts with, for example, debris on a roadway beneath the vehicle 102 or other obstructions, the connection points on the underside 106 of the vehicle 102 may be recessed from the underside 106 of the vehicle 102 away from the roadway such that the system 100 is at least partially received in a recess on the underside 106 of the vehicle 102. In one embodiment, the system 100 further includes a cover plate (not shown) attached to the vehicle 102 such that the battery housing 104 and the plurality of straps 108 are enclosed by the cover plate and the vehicle 102.

Advantageously, the straps 108 can be formed from a stamping or rolling process such that a material of uniform thickness can be utilized and shaped as desired. In an exemplary embodiment, a strap 108 is approximately ¼ inch thick along the third axis 120, approximately 2 inches wide along the second axis 114, and approximately 6 feet long along the first axis 112, although other lengths, widths, and thicknesses are contemplated, such as to account for battery housings of different weights and sizes.

In a further embodiment, a damper member (not shown) such as a rubber footing is positioned between at least one of (i) the end portions 122 and 124 (ii) the battery housing 104, and (iii) the underside 106 of the vehicle 102. In another embodiment, a damper member (not shown) is positioned between the base portion 138 of the strap(s) 108 and the battery housing 104. The damper member is advantageously configured to damp forces resulting from a shock load and to cushion the battery housing 104 within the system 100. The damper member can be, for example, an elastic material such as rubber, a member that includes springs or that is configured to elastically deform, or the like.

Although the vehicle 102 illustrated in FIG. 1 is depicted as a car, it should be understood that other vehicles such as vans, trucks, busses, boats, planes, trains, trolleys, construction equipment, and trailers.

In a further embodiment, rather than mounting the battery system to an underside of an electric vehicle, the battery mounting system restrains motion of a battery system positioned on top of a surface that forms the underbody of the vehicle. In this embodiment, the straps are held in tension to hold the battery system down on the surface. In one embodiment, the surface is comprised by an under-tray or a plate affixed to the structure of the vehicle.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

The invention claimed is:

1. A vehicle battery system, comprising:
a battery housing that is configured to house a battery, the battery housing including a plurality of guides distributed along a first axis, each guide of the plurality of guides extending at least partially about the battery housing along a second axis orthogonal to the first axis, each guide including a first channel portion in the battery housing, each first channel portion extending along a first side of the battery housing, the first side of the battery housing lying on a plane defined by the first axis and the second axis, each first channel portion defining a wall portion perpendicular to the first axis; and
a plurality of straps, wherein:
each strap of the plurality of straps is associated with a respective guide of the plurality of guides, each strap configured to extend about the battery housing, each strap including a first end portion and a second end portion;

each of the first end portions and the second end portions is configured to be attached to a vehicle; and the plurality of straps is designed and configured such that upon application of a shock load to the battery housing along the first axis, the plurality of straps plastically deforms prior to plastic deformation of the battery housing at portions of the plurality of straps that are in direct contact with the wall portions of the plurality of guides.

2. The system of claim 1, wherein the plurality of straps is configured such that upon application of a shock load to the battery housing along the second axis, the plurality of straps plastically deforms prior to plastic deformation of the battery housing.

3. The system of claim 2, wherein the plurality of straps is configured such that upon application of a shock load to the battery housing along a third axis orthogonal to the first axis and second axis, the plurality of straps plastically deforms prior to plastic deformation of the battery housing.

4. The system of claim 3, wherein each guide of the plurality of guides further includes:

a second channel portion in the battery housing, each second channel portion extending along a second side of the battery housing, the second side of the battery housing lying on a plane defined by the first axis and the third axis.

5. The system of claim 4, wherein each guide of the plurality of guides further includes:

a third channel portion in the battery housing, each third channel portion extending along a third side of the battery housing, the third side of the battery housing lying parallel to the second side.

6. The system of claim 5, wherein the first end portions and second end portions of the plurality of straps are configured to hold each strap of the plurality of straps in tension when attached to the vehicle.

7. The system of claim 6, wherein each strap of the plurality of straps defines a U-channel that includes:

a base received in the first channel portion; and a pair of side portions respectively received in the second channel portion and the third channel portion.

8. The system of claim 7, wherein:

the U-channel has a C-channel cross section, at least in part, that includes:

a pair of side portions that extend outwardly away from the battery housing and bear against the wall portion of the first channel portion; and a back portion that extends between the pair of side portions and supports the battery housing; and the C-channel is configured to reinforce a stiffness of each strap along at least one axis.

9. The system of claim 3, wherein the plurality of straps is configured to deform to absorb a shock load of at least 50 g's along at least one of the first axis, the second axis, and the third axis prior to deformation of the battery housing.

10. The system of claim 9, wherein the plurality of straps is configured to deform to absorb a shock load of at least 50 g's along each of the first axis, the second axis, and the third axis prior to deformation of the battery housing.

11. The system of claim 1, wherein:

each of the first end portions and the second end portions defines a hole; and a respective connection member passes through the hole of each of the first end portions and the second end portions to attach the first end portions and second end portions to the vehicle.

12. The system of claim 11, wherein the respective connection member includes at least one of a bolt, a screw, a peg, a clip, and a hook.

13. The system of claim 1, wherein each of the first end portions and the second end portions is attached to an underside of the vehicle, each strap of the plurality of straps further including a base portion on which a corresponding guide rests such that the plurality of straps supports the weight of the battery housing.

14. The system of claim 13, wherein the system is positioned at least partially within a recess in the underside of the vehicle.

15. The system of claim 14, further comprising a cover plate configured to cover a side of the battery housing facing away from the vehicle.

16. The system of claim 15, wherein the cover plate is attached to the underside of the vehicle and is unattached to the battery housing and the plurality of straps.

17. The system of claim 1, wherein the plurality of straps has a lower yield strength than the battery housing.

18. The system of claim 1, wherein the first side of the battery housing is a bottom side of the battery housing.

19. The system of claim 7, wherein the base is arranged beneath the battery housing so as to support the battery housing.

* * * * *